Feb. 6, 1951      G. W. HATCHER, SR      2,540,203
FLEXIBLE CONNECTION
Filed June 27, 1949
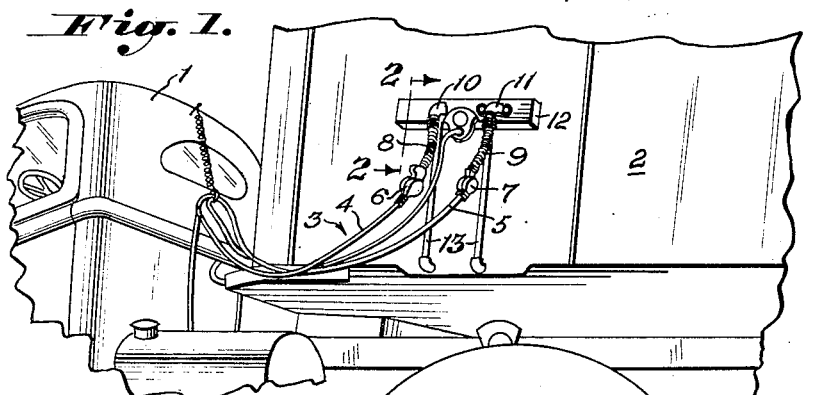
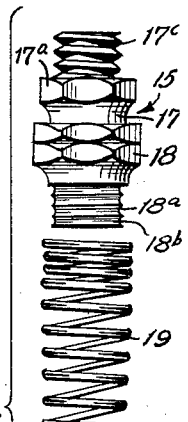
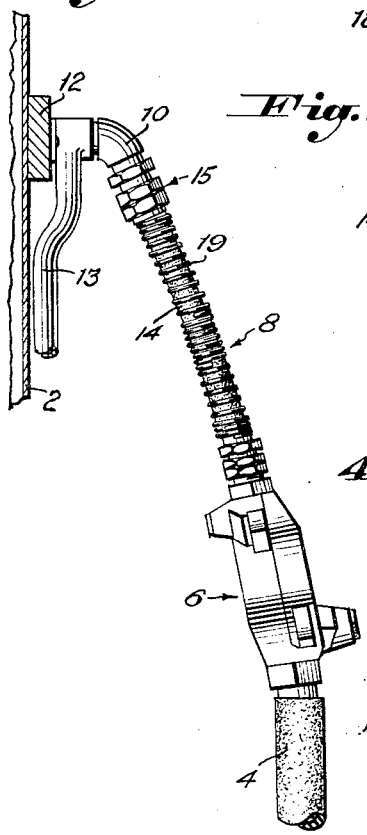
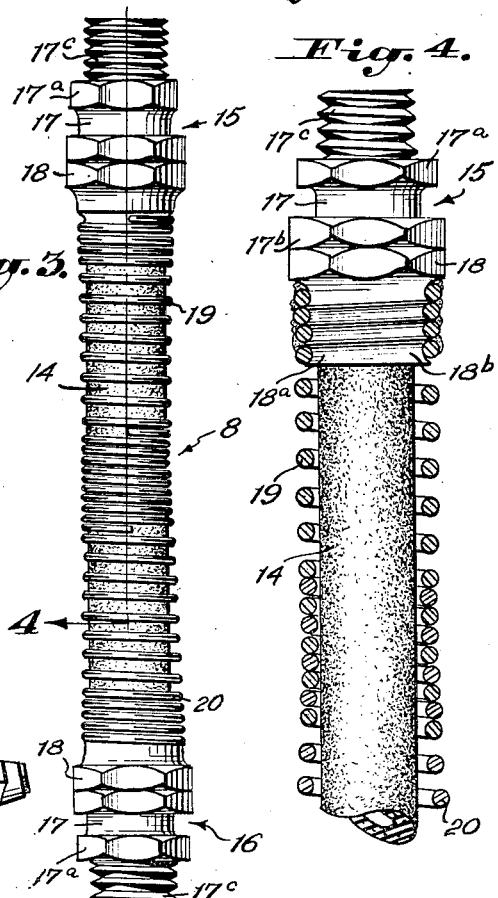
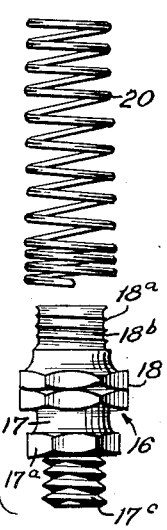
INVENTOR
George W. Hatcher, Sr
BY Elizabeth Newton Dew
ATTORNEY Patented Feb. 6, 1951

2,540,203

UNITED STATES PATENT OFFICE 2,540,203

FLEXIBLE CONNECTION

George W. Hatcher, Sr., Richmond, Va.

Application June 27, 1949, Serial No. 101,547

4 Claims. (Cl. 138—25)

This invention relates to flexible pressure connections and, more particularly, to a flexible connection for the fluid pressure brake lines of automotive vehicles.

A type of tractor-trailer in common use at the present time consists of a tractor having a motor, driven wheels and the usual driver controls, and a trailer having its front end swiveled upon a rear shoe of the tractor and supported thereby, and one or more wheel-supported axles at its rear end. The wheels of both the tractor and trailer are supplied with brakes actuated by fluid pressure, for example, compressed air, supplied under control of a driver-operated foot pedal, from a source of pressure fluid carried by the tractor.

Since the trailer is articulated to the tractor and must be pivotable relatively thereto through a relatively large angle, as when the combination "jack-knifes" in loading and unloading, the brake hose lines from the source of supply on the tractor to the header on the trailer, must be flexible, while capable of carrying pressure of the order of 100 p. s. i. or above. Consequently, the coupling or connectors between the brake lines from the tractor and the header upon the trailer, are subject to severe conditions of use and, prior to my invention, were a frequent source of trouble and danger because a loaded trailer, with inoperative brakes becomes unwieldly and difficult to stop on the highway.

It is therefore the principal object of my invention to provide a reinforced flexible pressure-line connector which is fully reinforced throughout its length and is doubly reinforced at the points of greatest bending and stress.

Another object is to provide a connector of the type mentioned which is relatively simple in construction and, at the same time rugged and long-lived in service.

Other objects will be apparent after a study of the specification in connection with the accompanying drawing in which, Figure 1 is a left elevation of a portion of a tractor-trailer combination showing the brake lines including the connector forming the invention.

Figure 2 is a view to an enlarged scale showing the flexible connector inserted between the coupler and brake line, as seen in a plane indicated by the line 2—2 of Figure 1.

Figure 3 is a side view of the flexible connector upon a still larger scale.

Figure 4 is a longitudinal cross section to a somewhat larger scale than Figure 3, of one-half of the connector, as indicated by the line 4—4 of Figure 3, and Figure 5 is an exploded view of the complete connector.

Referring in detail to the drawings, and particularly to Figure 1, the numeral 1 identifies a portion of the tractor of a well-known tractor-trailer combination while numeral 2 identifies a portion of the trailer. The brakes of the trailer are powered by compressed air from a source or tank on the tractor over flexible tubing or pressure lines generally indicated by the numeral 3. Thus flexible pressure lines 4 and 5 extend from the driver controlled valve (not shown) on the tractor, to couplings 6 and 7, respectively, thence through flexible connections 8 and 9 of the invention, to elbows 10 and 11 attached to a bar 12 on the side of the trailer, and thence by way of rigid tubing 13, to the brake servo-motors. Since the connections 8 and 9 are duplicates, a description of one will suffice.

The connector 8 comprises a length of heavy duty flexible rubber tubing 14 having a pressure-tight connection at each end with a respective coupling 15 and 16. The couplings may be duplicates, each consisting of fittings 17 and 18 constructed and arranged in a well-known manner, to clamp the adjacent end of the tube 14 therebetween to make a pressure tight connection between tube and fittings. The fitting 17 consists of a sleeve having hexagonal portions 17a and 17b and a nipple 17c for connection at one end with couplings 6 or 7 and elbows 10 or 11 at the other end.

The fitting 18, in accordance with my invention, is formed with a tubular extension or skirt 18a having a helical groove 18b formed externally thereof, to threadedly engage one end of a spring 19.

As clearly shown upon Figures 2 to 5, inclusive, this spring, at the end adjacent coupling 15, has its convolutions a distance equal to the pitch of helix 18b for a distance from the end substantially equal to the length of skirt 18a. The spacing or pitch of the spring convolutions is then increased to a distance equal to substantially twice the diameter of the wire from which the spring is formed. The spring has an overall length sufficient to extend, in the model illustrated, a half-inch or so past the central portion of tube 14.

The coupling 16 at the other end is a duplicate of 15, just described, and the thread or helical groove 18a of its extension engages a second spring 20, which may be a duplicate of spring 19. The two springs are interthreaded at their central portions as clearly shown upon Figures 3 and 4, to provide a double reinforcement over the central portion of the tube where the greatest stress and bending occur.

Each spring 19 and 20 is rigidly secured to its respective tubular portion, as by welding or soldering. And since the tube 14 has approximately the same external diameter as the internal diameter of the springs at their interengaging ends, the springs are firmly fixed against any substantial relative lateral movement.

In assembly, a fitting 18 is slipped over one end of tube 14 and clamped thereto by threading a fitting 17 in position with its inner end in the tube. The two fittings are then threaded together to clamp the end of the tube and firmly unite the same in fluid-tight relation with the fittings. A spring or reinforcement 19 is slipped over the tube from the other end, turned or threaded onto fitting 18, as shown at Figure 4, and rigidly secured thereto, as by soldering. The other spring or reinforcement 20 is then slipped over the tube and twisted into interengaging relation with spring 19, as shown on Figures 2 and 3. The fittings 17 and 18 are attached at the other end and after clamping to the tube, spring 20 is soldered to its fitting 18, to complete the assembly.

I have thus provided a pressure-connector which is highly flexible to permit a trailer and its truck to "jack-knife" as in loading and unloading. At the same time, the connector is rugged and long-lived because it is doubly reinforced at the portion where the maximum bending and stresses occur. Furthermore, the two springs 19 and 20, being merely interengaged or interthreaded, can have a slight relative rotation when one end of the connector twists relatively to the other. In this manner unwinding or tightening of the spring reinforcement is avoided as is the case where a single spring reinforcement is used. Consequently the springs remain at the same diameter at all times and afford uniform reinforcement under all conditions of use.

While I have disclosed the preferred form of the invention as now known to me, various modifications, changes of shape and substitutions of equivalents will occur to those skilled in this art after a study of the foregoing specification. Hence, I do not wish to be limited to the precise details of construction shown and desire that the disclosure be taken in an illustrative rather than a limiting sense. It is my desire and intention to reserve all constructions falling within the scope of the sub-joined claims.

Having now fully disclosed the invention, what I claim and desire to secure by Letters Patent is:

1. A flexible reinforced pressure line connector comprising a flexible tube, and a pair of coil springs surrounding said tube to reinforce the same, said springs being interwound at their meeting ends to provide double reinforcement over a portion of said tube intermediate the ends thereof.

2. In a flexible connector, a length of flexible tube, metallic fittings each having a fluid-tight connection with respective ends of said tubing, and a pair of coil springs about said tubing, each spring being secured at one end to a respective fitting, said springs being interthreaded at their meeting ends to provide a double reinforcement over a central portion of said tube only.

3. A flexible pressure connection comprising, a flexible tube, a pair of metallic fittings each having a fluid-tight connection with a respective end of said tube, a first coil spring extending about said tube and secured at one end to one said fitting, a second coil spring extending about said tube and secured at one end to the other said fitting, said first and second springs being interwound at their meeting ends to provide a double reinforcement of said tube over the central portion thereof.

4. A flexible reinforced pressure line connector comprising a pair of metallic fittings, a flexible hose connecting said fittings in fluid pressure tight connection therewith, a first coil spring secured at one end to one said fitting and embracing said hose for more than half the length thereof, a second coil spring secured at one end to the other said fitting and embracing said hose for more than half the length thereof, said springs being interwound over their coextensive portions to provide double reinforcement over the length of said hose surrounded by said coextensive portions.

GEORGE W. HATCHER, Sr.

REFERENCES CITED

The following references are of record in the file of this patent:

UNITED STATES PATENTS

| Number | Name | Date |
| --- | --- | --- |
| 826,353 | Painton | July 17, 1906 |
| 2,185,741 | Sorg | Jan. 2, 1940 |
| 2,215,238 | Wert | Sept. 17, 1940 |
| 2,256,388 | Fentress | Sept. 16, 1941 |